Aug. 14, 1956     H. D. LATHROP ET AL     2,758,482
BELT DRIVE AND GUIDE THEREFOR
Filed Oct. 23, 1953
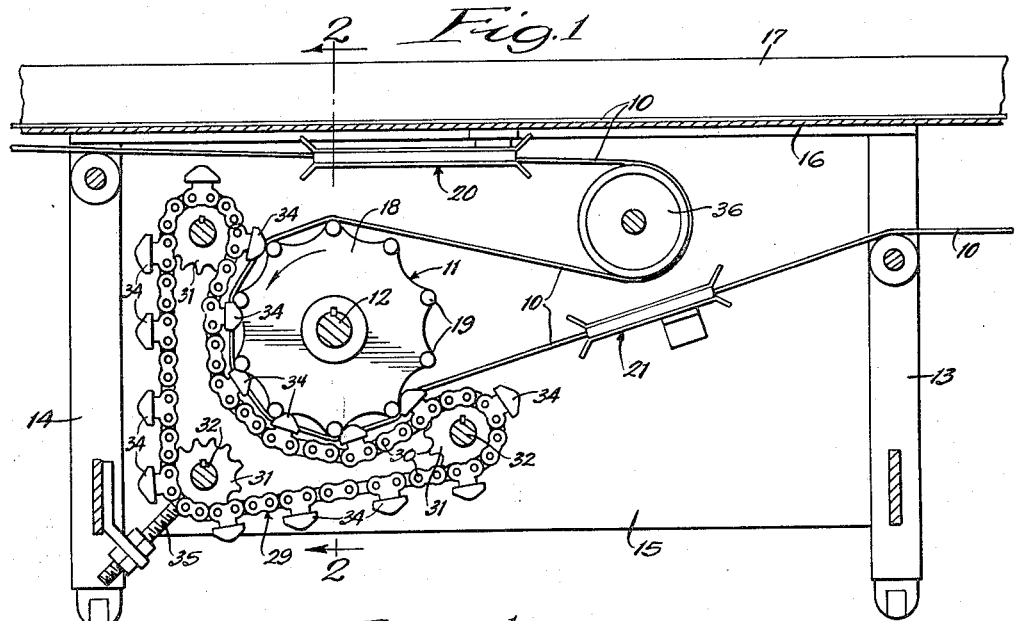
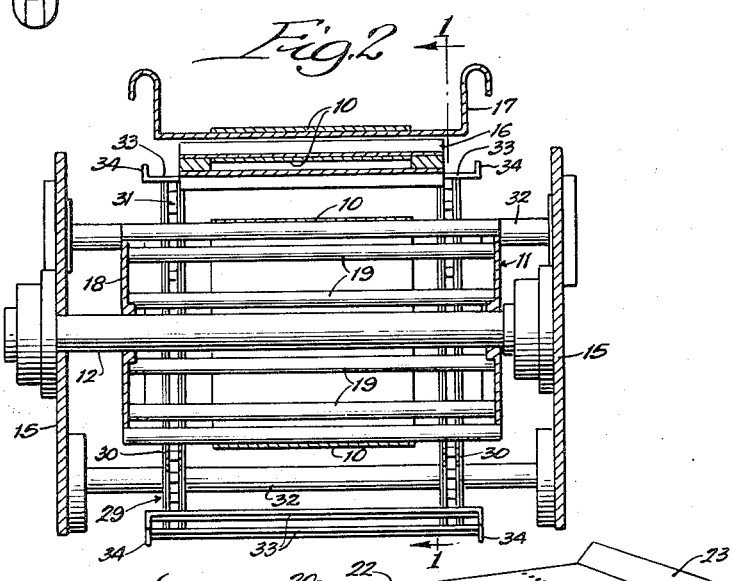
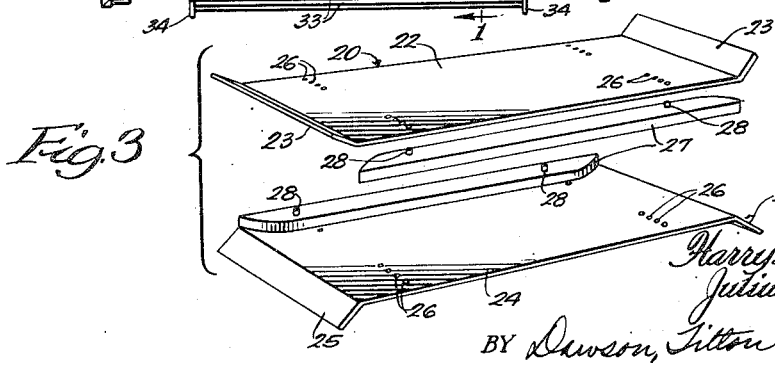
INVENTORS:
Harry D. Lathrop and
Julius J. Barski,
BY Dawson, Tilton & Graham
ATTORNEYS.

United States Patent Office 2,758,482
Patented Aug. 14, 1956

2,758,482
BELT DRIVE AND GUIDE THEREFOR

Harry D. Lathrop and Julius J. Barski, Chicago, Ill., assignors to The Lathrop-Paulson Company, Chicago, Ill., a corporation of Illinois Application October 23, 1953, Serial No. 388,026

7 Claims. (Cl. 74—216.5)

This invention relates to a belt drive and guide therefor. The invention is particularly useful in a structure in which a belt is engaged on both sides by driving means for the effective operation of the belt.

The present application is a continuation-in-part of our co-pending application, Serial No. 359,856, filed June 5, 1953, now Patent No. 2,741,133.

In many operations, it is found that a belt which is driven by gear mechanism tends to slide off one side of the structure and to engage the gears and be damaged. Further, in operations in which a gripping gear or belt is employed in connection with the drive wheel, there is a tendency for the belt to move laterally and to be engaged by the teeth or gear parts, which seriously damage the belt. In the use of a belt in hardening rooms or refrigeration chambers and also under other adverse conditions, there is a tendency for the belt to slip upon the drive wheel or drum, and even when the belt is tightened upon the drive wheel, this imposes excessive wear upon the portion of the belt contacting the drum.

An object of the present invention is to provide guide means which engage but a slight portion of the belt while at the same time guiding it effectively for engagement with a drive wheel or drum and also with gripping members carried thereby. A further object is to provide relatively inexpensive and effective means for driving a belt without causing excessive wear upon either side of the belt. Another object is to provide means whereby a belt may be guided while at the same time being driven by means engaging opposite sides of the belt. Yet another object is to provide a flexible gear structure which is driven by means independent of the belt for engaging the outer side of the belt while at the same time providing guide means for protecting the belt from engagement with said independent means. Other specific objects and advantages will appear as the specification proceeds.

The invention is shown, in an illustrative embodiment, by the accompanying drawing, in which—

Figure 1 is a vertical sectional view of apparatus embodying our invention; Fig. 2, a transverse sectional view, the section being taken as indicated at line 2—2 of Fig. 1; and Fig. 3, a perspective view of an adjustable guide device which may be employed in accordance with our invention, the parts of the guide being shown in spaced-apart relation.

In the illustration given, 10 designates a belt which is preferably a continuous belt, carried by a drive wheel 11 mounted upon shaft 12. Shaft 12 may be driven by any suitable means, or, if desired, the belt may be driven by a drum or wheel (not shown).

In the illustration given, 13 and 14 designate standards connected by side plates 15 and supporting a plate 16 upon which is mounted a U-shaped belt guide 17. Any suitable frame for supporting the structure herein described may be employed.

The drive wheel 11 may be of any suitable type or structure. In the illustration given, we provide end plates 18 which are connected by crossbars 19 to form a reel or wheel for receiving the belt 10.

In combination with the belt and belt drive structure described, we provide guide members 20 and 21 which may be of any suitable size and in any desired location for maintaining the belt in alignment with the drive wheel 11. In the operation of the belt, a single guide for holding the belt in alignment as it moves upon the wheel 11 may be provided. We prefer, however, to employ two guides 20 and 21, because this permits the belt to be readily reversed, while at the same time keeping the belt accurately positioned.

Guides 20 and 21 are preferably the same in construction, and in Fig. 3 a detailed showing of the guide 20 is set out. There is provided an upper guide plate 22, the ends 23 thereof being turned upwardly and outwardly. There is also a lower plate 24, having downwardly and outwardly-turned ends 25. Each of the plates is provided near its end with a row of adjustment openings or holes 26 arranged to be brought into alignment when the plates are superposed in operative position, as illustrated in Fig. 1. Guide bars 27 are provided on opposite sides and between the plates, each of the bars being provided with an opening 28 through which a bolt may be extended. With the bars 27 in spaced-apart relation and secured to plates 22 and 24 by bolts, an adjustable guide is provided for the belt 10. In actual operation, it is found that the belt 10, in extending through the space between the plates 22 and 24, engages the guide plates or bars only in one or two places, such slight contact being sufficient to maintain the belt in its desired aligned position. To avoid binding, the bars 27 may be adjusted between the plates 22 and 24 while at the same time maintaining the belt in the desired alignment.

In order to keep the belt from slipping upon the drive wheel or drum 11, we provide a flexible gear or gear chain 29. The gear 29 comprises a pair of chains 30, mounted upon spaced gears 31, as shown more clearly in Fig. 1, the gears being supported by shafts 32 mounted upon the frame parts 15. Extending transversely of the chains 30 are crossbars 33 provided with teeth 34 adapted to extend inwardly into engagement with the cross rods 19 of the drive wheel 11, as shown more clearly in Fig. 1. The teeth 34 extend lateraly of the belt 10 and engage the cross bars 19 and are driven by the cross bars 19 as the wheel 11 rotates. Thus the wheel 11, in rotating, drives the teeth 34 and thereby the flexible gear 29, and the cross bars 33 are thus urged against the outer side of the belt 10 so as to grip the outside of the belt at the same time that the inside of the belt is being propelled by the cross rods 19 of the drum 11. In this operation, the guides 20 and 21 maintain the belt 10 accurately centered between the teeth 34 of the flexible gear 29.

Adjustment means 35 may be provided for moving one of the gears laterally so as to tighten the gear upon its shaft mounted within a slot in the side plate 15.

Operation

In the operation of the foregoing structure, the belt 10 is driven by the rotation of shaft 12 carrying the drum or wheel 11 and the crossbars 19. As the crossbars 19 move in a counter-clockwise direction, they engage the inwardly-extending teeth 34 of the flexible gear 29 and cause the gear to move carrying the crossbars 33. The crossbars 33 engage against the outside of the belt and thus independently drive the belt by engagement of the outside thereof, while the inside of the belt is being engaged by the cross rods 19 of drum 11. The teeth 34 of the flexible gear 29 extend laterally of the belt 10 and the guides 20 and 21 are effective in maintaining the belt in constant spaced relation away from the teeth 34.

The belt 10, after leaving the guide 20, may pass directly to the drive gear 11, or it may pass around an idler roll 36, as illustrated in Fig. 1. With this structure, the guide 20 is effective in maintaining the belt 10 accurately upon the guide roll 36, and this is sufficient to maintain the belt leaving the guide roll accurately upon the cross rods 19 of the drive drum 11.

Accurate adjustment of the belt within the guide members 20 and 21 may be effected by shifting the guide bars 27 between the plates 22 and 24, the bolts for retaining the bars 27 being passed through the selected openings 26 of the two plates for maintaining the bars 27 at the desired spaced distances.

In the foregoing apparatus, it is found that the belt is driven with a minimum of wear and without slipping, while at the same time the belt is always maintained out of contact with the gear or teeth and other cutting surfaces and in position for efficient operation.

While, in the foregoing specification, we have set forth a specific structure in considerable detail for the purpose of illustrating an embodiment of the invention, it will be understood that such details of structure may be varied widely by those skilled in the art without departing from the spirit of our invention.

We claim:

1. In combination with a drum having transverse bars arranged circumferentially thereof and a belt extending about said drum and engaging said bars, a continuous flexible gear mounted for lineal movement and having teeth engaging said transverse bars laterally of said belt whereby, upon the rotation of said drum, said flexible gear is driven, means for supporting a portion of said gear in abutting relation with said belt, spaced bars carried by said gear and pressing said belt inwardly of said transverse bars to secure said belt portion between said spaced bars and said transverse bars, and spaced plates having depending sides for maintaining said belt at a spaced distance inwardly of said teeth.

2. In combination, a driven drum equipped with spaced transverse members for supporting a belt, a continuous flexible gear chain equipped with teeth, means for supporting said gear chain for engagement of said teeth with said transverse members of said drum whereby, upon movement of said drum, said gear chain is driven, bars carried by said gear chain engaging the outer surface of said belt and pressing said belt toward said transverse members, and a guide member engaging the sides of said belt to maintain the same inwardly of said teeth.

3. The structure of claim 2, in which said guide member has rounded side plates engaging the sides of said belt.

4. In combination, a frame, a drum carried by a shaft mounted in said frame and having transverse bars, a belt carried by said transverse bars, a guide plate mounted on said frame and equipped with side flanges engaging the edges of said belt to center the same upon said transverse bars, and an endless gear chain equipped with teeth, engaging said transverse bars laterally of said belt and equipped with bars engaging the outer surface of said belt and pressing said belt toward said transverse bars, said frame supporting said gear chain to maintain said teeth in engagement with said bars outwardly of said belt.

5. The structure of claim 4, in which the teeth of said endless gear chain are carried by the bars thereof.

6. The structure of claim 4, in which there is a pair of endless gear chains, one mounted on each side of the belt.

7. In combination, a drum having spaced bars thereon, a belt having a portion engaging the bars of said drum, a pair of chain gears equipped with teeth engageable with said bars of said drum, means for supporting said chain gears whereby a loop portion of each chain follows the contour of said drum and with the teeth thereof engaging said spaced bars, bars carried by said chain gears and extending across said belt to press said belt between the bars of the gears and the bars of the drum, and a guide device consisting of spaced plates equipped with side guide bars receiving said belt and maintaining the same upon said drum at a spaced distance from and between the teeth of said flexible gears.

References Cited in the file of this patent

UNITED STATES PATENTS

| 640,797 | Nofsinger | Jan. 9, 1900 |
| 975,721 | Russell | Nov. 15, 1910 |
| 1,381,664 | Rogers | June 14, 1921 |

FOREIGN PATENTS

| 109,764 | Germany | May 25, 1928 |
| 3,047 | Great Britain | 1876 |
| 248,585 | Great Britain | Mar. 11, 1926 |
| 601,826 | Great Britain | May 13, 1948 |